April 6, 1926. Re. 16,315

W. B. SENSEMAN

DUST COLLECTOR

Original Filed April 20, 1921

Inventor
William B. Smoorman,
By Barnett & Truman,
Attorneys

Reissued Apr. 6, 1926. Re. 16,315

UNITED STATES PATENT OFFICE.

WILLIAM B. SENSEMAN, OF LOS ANGELES, CALIFORNIA.

DUST COLLECTOR.

Original No. 1,504,386, dated August 12, 1924, Serial No. 462,786, filed April 20, 1921. Application for reissue filed January 31, 1925. Serial No. 6,131.

*To all whom it may concern:*

Be it known that I, WILLIAM B. SENSEMAN, a citizen of th United States, residing in the city of Los Angeles, county of Los Angeles, and State of California, formerly of the city of Denver, county of Denver, and State of Colorado, have invented certain new and useful Improvements in Dust Collectors, of which the following is a specification.

My invention relates to dust collectors, and more particularly to certain improvements therein whereby a greater percentage of the dust drawn thereinto is collected and prevented from escaping into the atmosphere.

I have just discovered that a member formed with a multiplicity of small openings such as a perforated plate or reticulated screen, interposed across the chamber into which the dust is drawn, with means for moistening said member so as to cause a film of water to cover the openings, operates efficiently to collect the dust and to discharge the same with the water through a proper outlet at the lower end of said collector.

In order to further explain my invention, I have shown two embodiments thereof in the accompanying drawings, which I will now describe.

Figure 1:
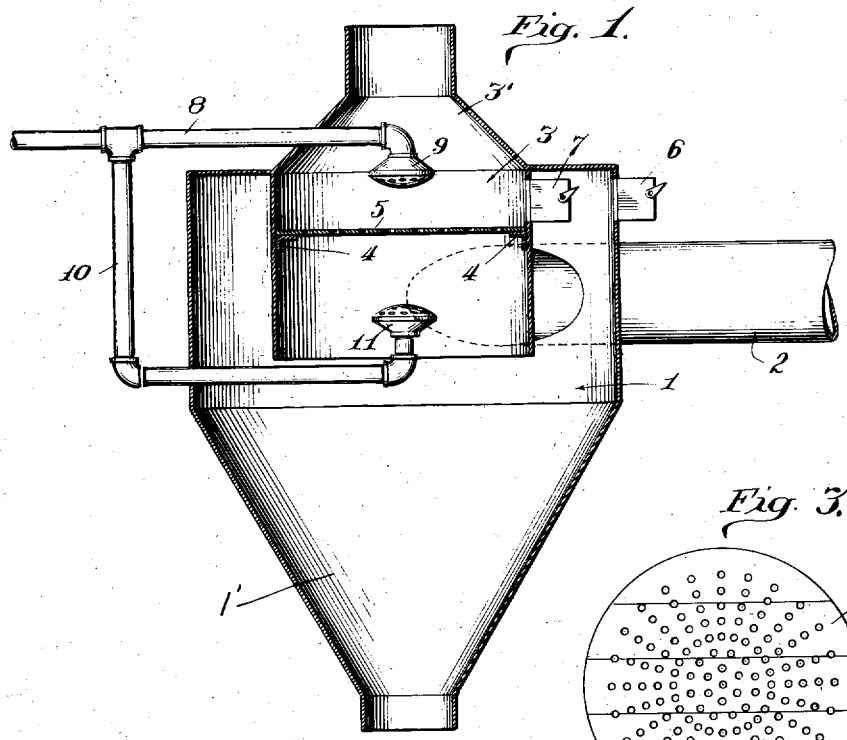
Figure 1 is a vertical sectional view through a dust collector in which my invention is embodied.
Figure 3:
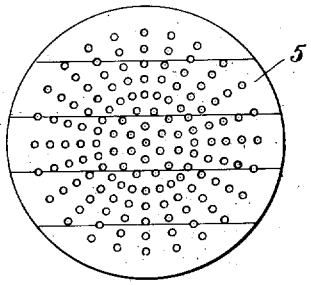
Figure 3 is a plan view of one form of reticulated member, made in sections for convenience of removal.

Referring first to Fig. 1, the outer housing 1, provided at the bottom with an outlet 1′ for water or other liquid and entrained dust, has connected thereto an air supply pipe, 2, which discharges thereinto tangentially, and carries with it all the dust collected from outside by suitable fans. Mounted within the outer housing 1, is an inner cylindrical member, 3, extending through the top of the outer housing, 1, and terminating in an opening, or outlet 3′ for the air or other gas liberated of its dust. Mounted within said inner member 3, on annular supporting means, 4, is a reticulated member, 5, made in sections, as shown in Fig. 3. Said members, 1 and 3, are provided with doors, 6 and 7, respectively, to afford access to said member 5, whereby it can be taken out for cleaning or replacement with others. Extended into the member 3, is a water supply pipe, 8, provided with a spray head, 9, discharging above the reticulated member 5, as indicated. A branch pipe 10, extends into the outer casing, 1, below the reticulated member 5, and is provided with a spray head, 11, as indicated, which discharges upwardly on the underside of the member 5.

Figure 2:
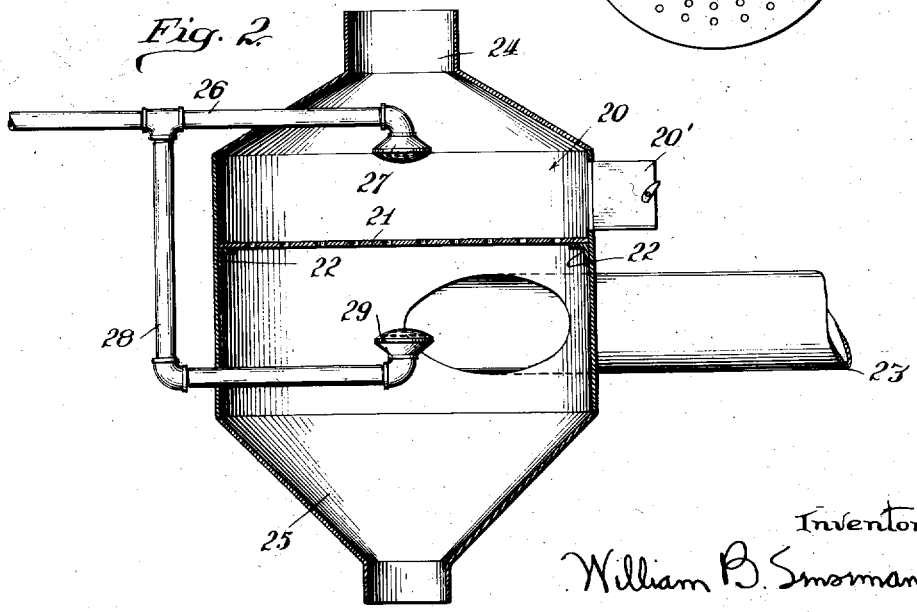
Figure 2 is a similar view of a slightly different device in which my invention is also embodied.

Referring to Fig. 2, the outer casing or housing is designated 20, and is provided with a similar reticulated member, 21, supported on an annular bracket or flange, 22, above the connection of the inlet dust supply pipe, 23, which also discharges tangentially into said outer housing as shown. Said outer housing 20, terminates above and below, in tapered outlets, as at 24 and 25. A water supply pipe, 26, extends into the housing 20, above the member 21, and is provided with a discharge spray head, 27, and a branch pipe, 28, extends into said housing, below said member 21, and is provided with a spray head, 29, as shown.

It will be understood that the dust and air as discharged into the outer housings, in either form, develops a whirling action. In the form of the invention shown in Fig. 1, this whirling action is around the outside of the inner member 3, and thence up through the lower end of said inner member 3. In the form of the invention shown in Fig. 2, this whirling action is below the member 21, although there is a considerable whirling action set up in said outer housing, above the member 21, caused by the passing of the air and dust through the perforations from its whirling action below said member. In each case the whirling movement of the air imparts, necessarily, a similar movement to the water on the screen. The film of water which is formed on the member, 5, in Fig. 1, and on member 21, in Fig. 2, operates to catch the dust and to carry it with the water down through the lower ends of the devices, the action being the same in both cases. I have shown two sprays in both embodiments of the invention, although it is to be understood that any sufficient means for causing a film of water on the surface of said member and over the perforations or openings therein is the object sought to be accomplished. A door is also provided in Fig. 2, designated 20′.

I am aware that changes in the details can be made in my invention as here illustrated without departing from the spirit thereof, and I do not, therefore, limit my invention to the details shown, except as I may be limited by the hereto appended claims.

I claim:

1. In a dust collector, the combination of a housing to receive dust ladened air, a supply pipe opening into said housing, the arrangement comprising means for causing the air to whirl within said housing, a member with small holes therethrough mounted across the inside of said housing, and means for delivering a liquid to the upper face of said member for maintaining thereon a film of the liquid at said holes.

2. A dust collector comprising a housing to receive dust-ladened air, a supply pipe connected tangentially therewith, whereby to discharge said dust-ladened air tangentially into said housing to cause a whirling action, a member with small holes therethrough mounted across the inside of said housing, and means within said housing for continuously spraying said member during the operation of said device, whereby to maintain a film of water over the holes in said member, for the purpose described.

3. A dust collector comprising a housing of cylindrical form to receive dust-ladened air, an inner cylindrical member spaced from said outer housing, whereby to form an annular space therebetween, an outlet from the lower end of said outer housing and an outlet from the upper end of said inner cylindrical member, a perforated member across the inner cylindrical member, means for spraying said perforated member within said inner cylindrical member, and a supply pipe for dust-ladened air connected tangentially with said outer casing whereby to discharge tangentially into the annular space between said outer housing and said inner cylindrical member.

4. A dust collector comprising in combination, an outer housing, a supply pipe connected to discharge tangentially thereinto, an inner cylindrical member extended through the top of said housing and down into the same and having an open lower end and an open upper end, whereby dust discharged into said outer housing must pass upwardly through the lower end of said inner member, said outer housing being open at its lower end for connection with a discharge pipe, a perforated member positioned in said collector in the passageway for dust passing upwardly therein, and spray devices adjacent said perforated member for keeping the same wet during the operation of said dust collector, substantially as described.

5. In dust collecting apparatus, the combination of a casing having an inlet for dust laden air and an outlet for cleansed air, a member having a multiplicity of perforations arranged to cross the casing between said inlet and outlet and means for maintaining a body of liquid on the upper side of said member, through which the air is compelled to pass in moving from inlet to outlet.

6. In dust collecting apparatus, the combination of a casing having an inlet for dust laden air and an outlet for cleansed air, a member having a multiplicity of perforations arranged to cross the casing between said inlet and outlet and means for maintaining a body of liquid upon and in constant movement over the upper side of said member, through which the air is compelled to pass in moving from inlet to outlet.

7. In dust collecting apparatus, the combination of a casing having an inlet for dust laden air and an outlet for cleansed air, a member having a multiplicity of perforations arranged to cross the casing between said inlet and outlet and means for maintaining a body of liquid in whirling movement on the upper side of said member, through which the air is compelled to pass in moving from inlet to outlet.

8. In dust collecting apparatus, the combination of a casing having an air outlet at its upper end and a liquid outlet at its lower end, a thin perforated member extending substantially horizontally across the casing between said inlet and outlet, means for delivering liquid upon the upper surface of the perforated member and means for introducing dust laden air into the casing below said perforated member with an upward whirling movement.

9. Method of collecting dust which consists in discharging water upon the upper surface of a thin perforated member and causing dust laden air to be projected upwardly with a whirling movement against the under side of said member.

WILLIAM B. SENSEMAN.